A. W. AYLING & P. F. REICHERT.

FLOAT.

APPLICATION FILED SEPT. 18, 1911.

Reissued Mar. 26, 1912.

13,389.

Arthur W. Ayling
Paul F. Reichert
Inventors

Witnesses
Gladys Jameson
A. H. Rauch.

By Geo. Kirk
Attorney

UNITED STATES PATENT OFFICE.

ARTHUR W. AYLING AND PAUL F. REICHERT, OF TOLEDO, OHIO.

FLOAT.

13,389. Specification of Reissued Letters Patent. Reissued Mar. 26, 1912.

Original No. 952,496, dated March 22, 1910, Serial No. 520,336. Application for reissue filed September 18, 1911. Serial No. 650,042.

*To all whom it may concern:*

Be it known that we, ARTHUR W. AYLING and PAUL F. REICHERT, citizens of the United States, residing at Toledo, Lucas county, Ohio, have invented a new and useful Float, of which the following is a specification.

In the construction and use of floats for controlling valves it frequently happens that the float leaks and becomes useless from becoming filled with water. This is due to imperfect soldering or to the solder being eaten away by impure water.

Our invention is designed to overcome the difficulties here indicated and to furnish a float which is hermetically sealed and which employs no solder in the formation of the joints. We attain these objects by means of the devices, construction and arrangement of parts hereinafter described, and shown and illustrated in the accompanying drawings, in which—

Figure 1:
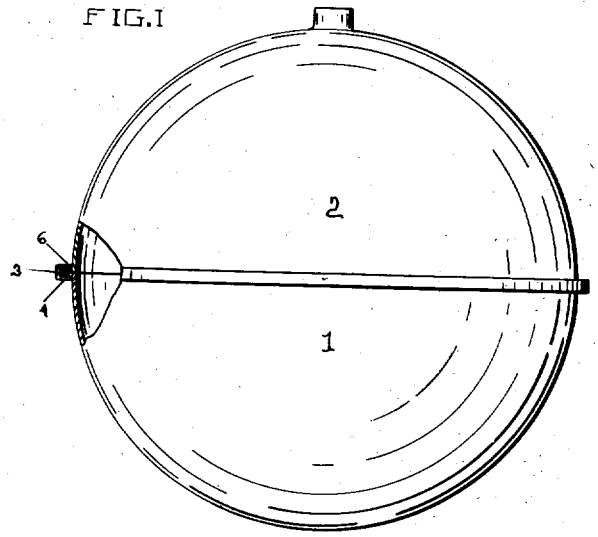
Figure 2:
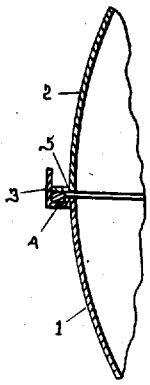

Figure 1 illustrates our float with the parts assembled and with a portion broken away to show the joint, hereinafter referred to, in transverse section; Fig. 2 a transverse sectional elevation of the joint, hereinafter referred to, in the course of construction and on an enlarged scale, and Fig. 3 the same, showing the joint completed.

Like numerals of reference indicate like parts throughout the drawings.

Figure 3:
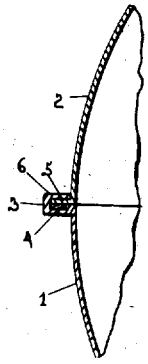

In the drawings, 1 and 2 are equal hemispherical sheet metal shells or float sections composed of brass, aluminum, copper or other suitable metal. If desired, the shell parts may be so formed as to present oval or cylindrical surfaces instead of spherical surfaces. At the margin of the shell-part 1 is an outwardly projecting flange or seat 3 having formed therein a channel in which is disposed a gasket 4 composed of rubber or other suitable material. Upon the margin of the shell-part 2 is formed a flat outwardly projecting flange or seat 5 which rests upon the gasket 4. The margin of the flange 3 projects upwardly far enough to permit its being turned backwardly or inwardly so that it will overlap or interlock with the flange 5, as at seat or flange 6 (Fig. 3). When the two shell-parts are brought together with the flange 5 resting upon the gasket 4, the projecting margin of the flange 3 is turned inwardly and powerfully compressed upon the flange 5, thus compressing the gasket within its channel and securing the two shell-parts immovably together. The turning of the flange 3 is accomplished between dies, the construction of which will be well understood by those skilled in the art without further explanation. The joint thus formed is air-tight and water-tight, and in practice has been found to be practically as indestructible as the metal of which the float is composed. The bringing of the float sections into this close relation effects a most perfect sealing or joint as the rubber gasket 4 attacks, especially, the copper containing metal sections, effecting a most thorough knitting of the parts together. The sealing agent or filling gasket 4, due to its combining properties, brings about a cementing of the opposing flanges of the shell parts to thus, in addition to the flange 5, assist in making a tight joint. The sulfur in the gasket rubber is a factor in the sealing, uniting in a most effective way with sheet copper.

Having described our invention, what we claim and desire to secure by Letters Patent is:

1. The combination in a float with a pair of float sections each having an endless seat, and an adhering agent directly uniting said section seats, of permanent holding means extending from one float section to embrace the other and directly force the seats against the section uniting adhering agent.

2. The combination in a float with a pair of float sections each having an endless copper seat, and a rubber adhering agent directly uniting said copper section seats, of permanent holding means extending from one float section to embrace the other and directly force the seats against the section uniting rubber adhering agent.

In testimony whereof we affix our signatures in the presence of two witnesses.

ARTHUR W. AYLING.
PAUL F. REICHERT.

Witnesses:
GEO. E. KIRK,
C. H. RAUCH.